March 1, 1932.  C. COHEN-VENEZIAN  1,847,173

AERIAL VEHICLE

Filed March 5, 1931

Inventor:
C. Cohen-Venezian
by
E. F. Wenderoth
Atty

Patented Mar. 1, 1932

1,847,173

UNITED STATES PATENT OFFICE

CARLO COHEN-VENEZIAN, OF TURIN, ITALY

AERIAL VEHICLE

Application filed March 5, 1931, Serial No. 520,452, and in Italy March 10, 1930.

This invention has for its object an arrangement for providing aerial vehicles with engaging means for their connection with lifting means or for fastening them on supporting means when required.

It is known that owing to the construction of its structure an aerial vehicle and particularly an aeroplane or a similar aircraft cannot be conveniently engaged by means of ropes or bands say when it is required to hang it to lifting means when it has landed beyond limits of a landing field or has fallen down, and that similar objectionable conditions arise when an aeroplane having its landing carriage damaged must be located on supporting and conveying means of any kind.

Such objections are removed by the arrangement of this invention, which consists in the provision of a number of transverse members fastened at suitable points on the fuselage structure, say on the engine frame, the ends of said transverse members projecting beyond the aeroplane fuselage or structure and providing means for engagement by hanging or supporting members.

On the annexed drawings an embodiment of this invention is shown by way of example and Figure 1 is a fragmentary side view of an aeroplane having an auxiliary frame according to this invention secured thereon for the purpose of lifting it;

Figure 1:
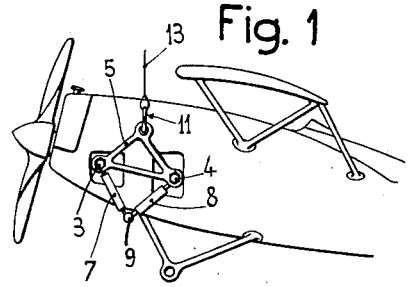

In the embodiment illustrated by way of example on the engine carrying spars 1, 1' of the aeroplane fuselage two transverse bars 3, 4 are fastened by means of bolts 2 and clips 12, said bars having their ends extending beyond the fuselage outline at the two sides of the same. The adjacent ends of said bars 3 and 4 on each fuselage side are inter-connected by means of a triangular structure 5, 5' having an attaching eye 6, 6' for connection, if desired by means of intermediate members, with the hook of a crane or of a lifting apparatus of any desired construction.

Rods 7, 7' and 8, 8' are also fastened on the ends of said transverse bars 3 and 4, said rods extending downwardly and having their adjacent ends interconnected with a bottom transverse bar 9. Said transverse bar 9 is provided at its ends with engaging means as studs 10 whose position and size are adapted for engagement by cooperating means of a carriage or the like on which the aeroplane is intended to be carried.

Figure 2:
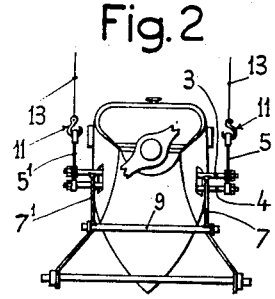
Figure 2 is a front view of the same.
Figure 3:
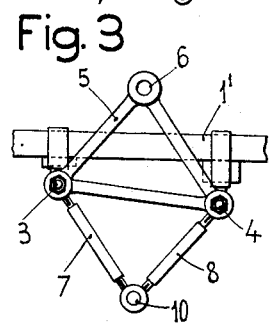
Figure 3 is a side view on an enlarged scale of the auxiliary frame of Figures 1 and 2.
Figure 4:
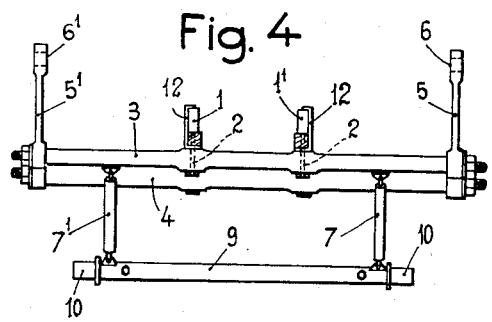
Figure 4 is a front view of the auxiliary frame of Fig. 3.
Figure 6:
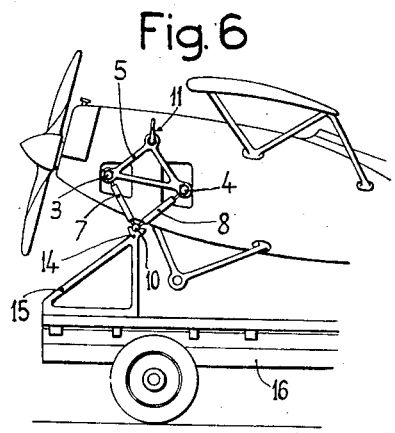
Figure 6 is a fragmentary side view of an aeroplane engaged by means of said frame on a supporting structure of a vehicle adapted to convey it on land.
Figure 5:
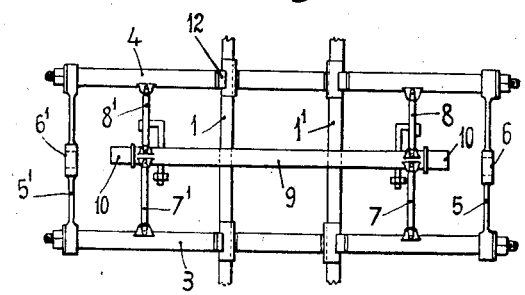
Figure 5 is a plan view of the same.
Figure 7:
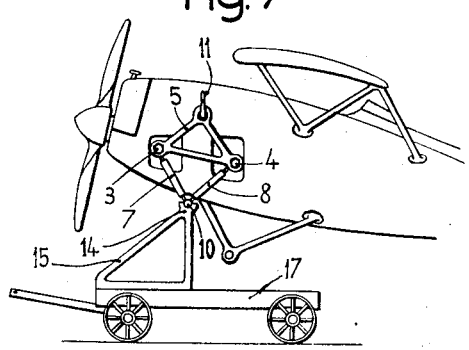
Figure 7 is a fragmentary side view of an aeroplane supported by means of said auxiliary frame on a rescue truck.

An aeroplane provided with the described hanging and engaging frame consisting of parts 3, 4, 5, 5', 7, 8, and 9, may be suspended to lifting means illustrated by way of example as consisting of chains 13 (Figures 1 and 2) by engaging hooks 11 attached to said chains 13, 13 in frame eyes 6, 6', or it may be fastened by means of studs 10, 10 of bar 9 on bearings 14 of supports 15 located on a carriage 16 as shown in Figure 6, or on bearings 14 of supports 15 of a hand truck 17 for manœuvering the aeroplane on land.

Of course the present invention is able of a number of modifications lying within the spirit of appended claims; say a single transverse bar as 3 or 4 or a larger number of such bars may be used instead of two ones, and such bars may be close to or spaced from each other they being suitably fastened on stiff members of the aeroplane structure.

The parts as 5, 5' or 7, 8 interconnecting the ends of such bars may accordingly have different shape and size in accordance with the character of the aeroplane they are located on, being only necessary that they provide a connection intermediate said bars and means for lifting or supporting the aeroplane or for both operations.

Rods 7, 7', 8, 8' instead of being directly connected with transverse bars 3 and 4, as illustrated, could also be connected with heads 5, 5' and transverse bar 9 may be more or less spaced from transverse bars 3 and 4 and have a more or less large extension.

Transverse bars as 3 and 4 instead of being connected with the engine carrying structure may be connected with any sufficiently stiff and easily reached member of the fuselage and more particularly with the fuselage nose.

By the described arrangement an aeroplane fuselage may be equipped with means enabling the aeroplane to be easily lifted or supported without any liability of injuring it.

What I claim as my invention and desire to secure by United States Letters Patent is:

1. In an aerial vehicle a device for lifting and supporting it comprising cross members fastened on the vehicle structure, said members having parts projecting beyond the vehicle outline, and a structure on each vehicle side interconnecting the adjacent ones of said parts and having engaging means.

2. In an aerial vehicle a device for lifting and supporting it comprising means fastened on the vehicle structure said means having parts projecting beyond the vehicle outline, a member on each vehicle side said members being connected with said parts, and a cross member extending under the vehicle structure and connected with said members.

3. In an aerial vehicle a device for lifting and supporting it comprising cross members fastened on the vehicle structure said members having parts projecting beyond the vehicle outline, a structure on each vehicle side interconnecting the adjacent ones of said parts and having engaging means, and a transverse bottom member engaged with said side structures and having connecting means for engagement by supporting means.

In testimony whereof I have signed my name to this specification.

CARLO COHEN-VENEZIAN.